United States Patent Office 3,743,637
Patented July 3, 1973

3,743,637
PHENANTHROTRIAZOLYL DERIVATIVES
Fritz Fleck, Bottmingen, Basel-Land, and Horst Schmid, Munchenstein, Basel-Land, Switzerland, assignors to Sandoz Ltd. (also known as Sandoz AG), Basel, Switzerland
No Drawing. Filed Aug. 4, 1971, Ser. No. 169,134
Claims priority, application Switzerland, Aug. 14, 1970, 11,257/70
Int. Cl. C07d 55/02
U.S. Cl. 260—240 C  11 Claims

ABSTRACT OF THE DISCLOSURE

Phenanthrotriazolyl derivative of formula

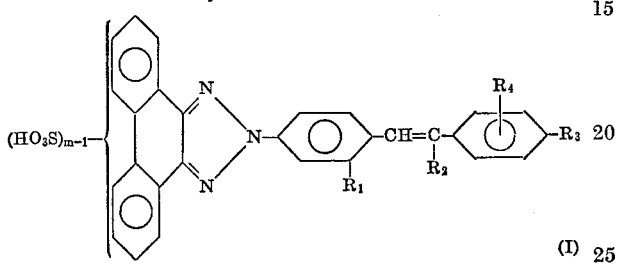

(I)

where $R_1$ and $R_4$, independently of each other, stand for H, F, Cl, CN, COOH, $SO_3H$, alkylsulphonyl, arylsulphonyl, an amide or ester of carboxylic acid or sulphonic acid or $R_1$ jointly with $R_2$ for —O—CO,
$R_2$ for H or —O—CO—,
$R_3$ for $R_1$, alkyl with 1 to 12 carbon atoms or optionally substituted phenyl or jointly with $R_4$ for

—CH=CH—CH=CH— when $R_4$ is vicinal to $R_3$ and
$m$ is 1, 2 or 3.

---

This invention relates to new phenanthrotriazolyl derivatives of formula

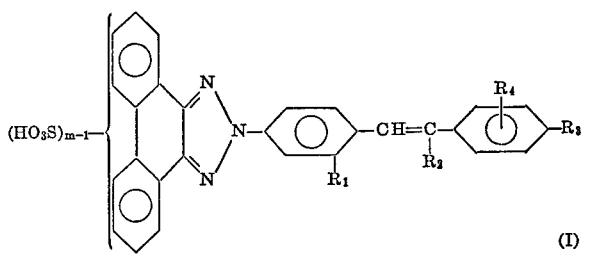

(I)

where $R_1$ and $R_4$, independently of each other, stand for a hydrogen, chlorine or fluorine atom, a cyano, carboxylic acid or sulphonic acid group, an amide or ester group of a carboxylic acid or sulphonic acid which may be further substituted, an alkylsulphonyl or arylsulphonyl group, or $R_1$ jointly with $R_2$ stands for an —O—CO group,
$R_2$ for a hydrogen atom or a carboxylic acid group, which may be bound to $R_1$ to form a lactone ring,
$R_3$ for a hydrogen, fluorine or chlorine atom, a cyano group, an alkyl group which has 1 to 12 carbon atoms and may be substituted, a carboxylic acid or sulphonic acid group, an amide or ester group of a carboxylic or sulphonic acid, which may be further substituted, an alkylsulphonyl or arylsulphonyl group, a phenyl radical which may be further substituted, or jointly with $R_4$, when $R_4$ occupies a vicinal position to $R_3$, for a chain —CH=CH—CH=CH—, and
$m$ for one of the members 1, 2 or 3.

The processes of production of the phenanthrotriazolyl derivatives of the Formula I comprise oxidative cylization of the Formula I comprises oxidative cyclization of a compound of formula

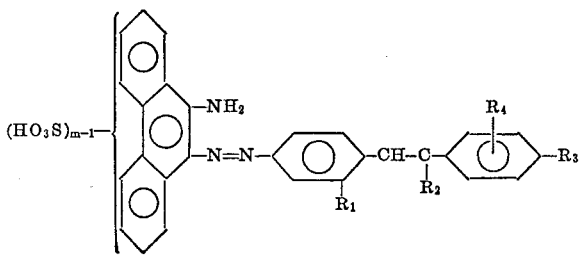

(II)

or condensation of 1 mol of a compound of formula

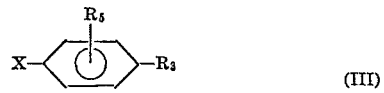

(III)

with 1 mol of a compound of formula

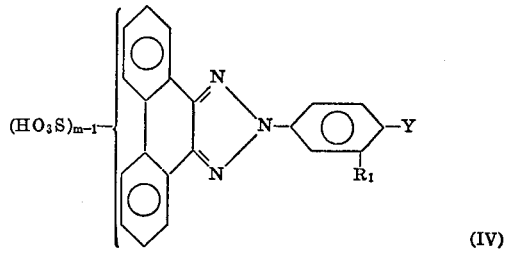

(IV)

if necessary with cleavage of the substituent Z, where in the two formulae either X or Y stands for a —CHO group or one of its functional derivatives such as the oxime, hydrazone or anile and the other symbol for a —$CH_2$—Z group,
Z stands for hydrogen, cyano, carboxy, a carboxylic acid ester or amide group which may be substituted,

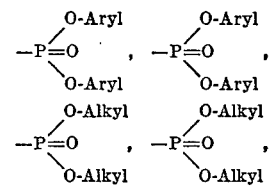

or

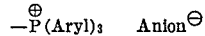

where alkyl, which includes cycolalkyl such as cyclohexyl, is preferably lower, e.g. with 1 to 6 carbon atoms, and may be substituted, e.g. by methoxy, ethoxy, phenyl or phenoxy;

aryl is preferably mononuclear and may be unsubstituted or substituted phenyl; and the anion$^\ominus$ is a monovalent anion$^\ominus$ such as Cl$^\ominus$, Br$^\ominus$, J$^\ominus$, CH$_3$—O—SO$_3^\ominus$, C$_2$H$_5$—O—SO$_3^\ominus$, CH$_3$—SO$_3^\ominus$, or saponification of the cyano group to the carboxyl group in a compound of formula

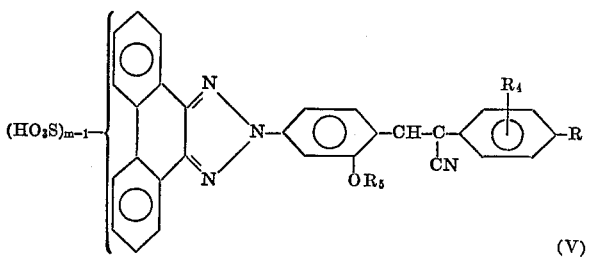

(V)

where R$_5$ stands for hydrogen or lower alkyl, followed by cleavage of R$_5$ if R$_5$ stands for lower alkyl and by lactone formation, or sulphonation or sulphohalogenation of a compound of Formula I in which $m$ stands for 1 and/or R$_1$, R$_3$ and R$_4$ do not stand for a sulphonic acid, sulphonamide or sulphonic acid ester group, followed by conversion of the resulting sulphonic acid halide into an ester or an amide.

If R$_1$ represents an alkylsulphonyl group it contains preferably 1 to 6 carbon atoms. If it represents an arylsulphonyl group it is preferably mononuclear and is advantageously a phenyl group which may be substituted by lower alkyl or alkoxy groups (with 1 to 6 carbon atoms) or by halogen atoms (chlorine or fluorine). Examples of such groups are n-hexylsulphonyl, n-amyl- and iso-amyl-sulphonyl, n-butyl- and iso-butyl-sulphonyl, n-propyl- and iso-propyl-sulphonyl, and especially ethylsulphonyl and methylsulphonyl further phenylsulphonyl, 2- and 4-methylphenyl-, 2- and 4-methoxyphenyl-, 2- and 4-ethoxyphenyl-sulphonyl, 4-chlorophenyl- and fluorophenylsulphonyl, 4-ethyl-, 4-iso-propyl-, 4-n-butyl-, 4-tert.butyl-, 4-tert. amyl-, 4-iso-propoxy- and 4-n-butoxy-phenylsulphonyl.

If R$_1$ represents an ester group of a carboxylic or sulphonic acid it may be an unsubstituted or substituted alkyl, cycloalkyl or arylester group of the acid, in which case alkyl has preferably 1 to 6 carbon atoms and cycloalkyl and aryl are preferably mono- or dinuclear. Examples of such ester groups of carboxylic and sulphonic acids are methyl-, ethyl-, n-propyl-, iso-propyl-, n-butyl-, iso - butyl-, tert.butyl-, n - amyl-, iso - amyl-, n - hexyl-, β-methoxyethyl-, β-ethoxyethyl-, β-n-butoxyethyl-, γ-methoxypropyl-, δ-methoxybutyl-, β-(β'-methoxyethoxy)-ethyl-, β - (β'-ethoxyethoxy)-ethyl-, β-(β'-n-butoxyethoxy)-ethyl-, β-hydroxyethyl-, β- and γ-hydroxypropyl-, β-chlorethyl-, β,β-difluorethyl-, benzyl-, β-phenylethyl-, β-phenoxyethyl-, cyclohexyl-, 4-methylcyclohexyl-, phenyl-, 2-, 3- and 4-methylphenyl-, 2- and 4-methoxyphenyl-, 2- and 4-ethoxyphenyl-, 2-, 3- and 4-chlorophenyl-, 4-fluorophenyl-, 4-ethylphenyl-, 4-iso-propylphenyl-, 4-n-butylphenyl-, 4-tert.butylphenyl-, 4-tert.amylphenyl-, 2,4- and 2,5-dimethylphenyl-, 2,4- and 2,5-dichlorophenyl-, naphthyl-1-, naphthyl-2- and 4-diphenylyl-ester groups.

If R$_1$ is an unsubstituted or substituted amide group of a carboxylic or sulphonic acid it may be an alkyl, cycloalkyl or arylamide group, in which case alkyl contains preferably 1 to 6 carbon atoms and cycloalkyl and aryl are preferably mono- or dinuclear. Examples of such amide groups of carboxylic and sulphonic acids, are the amide group itself, methyl-, ethyl-, n-butyl-, n-amyl-, n-hexyl-, -dimethyl-, diethyl-, β-hydroxyethyl-, β- and γ-hydroxypropyl-, di-(β-hydroxyethyl)-, di-(β- and γhydroxypropyl)-, β-methoxyethyl-, β-ethoxyethyl-, γ-methoxypropyl-, benzyl-, β-phenylethyl-, β-phenoxyethyl-, cyclohexyl-, 4-methylcyclohexyl-, phenyl-, 2-, 3- and 4-methylphenyl-, 2- and 4-methoxyphenyl-, 2- and 4-ethoxyphenyl-, 2-, 3- and 4-chlorophenyl-, 4-fluorophenyl-, 4 - ethylphenyl-, 4 - iso - propylphenyl-, 4-n-butylphenyl-, 4-tert.butylphenyl-, 4-tert.amylphenyl-, 2,4- and 2,5-dimethylphenyl-, 2,4- and 2,5-dichlorophenyl-, N-methyl-N-phenyl-, N-ethyl-N-phenyl-, N-β-hydroxyethyl-N-phenyl-, naphthyl-1-, naphthyl-2- and 4-diphenylyl-amide.

The radical R$_2$ is a hydrogen atom or jointly with R$_1$ a lactone group

whose $$-\underset{\underset{O}{\|}}{C}-$$

group is bound to the ethylenic carbon atom.

If R$_3$ is an ester or amide group of a carboxylic or sulphonic acid or an alkylsulphonyl or arylsulphonyl group it may have any of the meanings given for R$_1$.

If R$_3$ is an unsubstituted or substituted phenyl radical it may be a phenyl, mono- or poly-alkylphenyl, mono- or poly-alkoxyphenyl, mono- or poly-halogenophenyl radical, in which alkyl and alkoxy contain 1 to 6 carbon atoms and may be further substituted and halogen stands for fluorine or more especially chlorine. Examples of these radicals are 2-, 3- and 4-methylphenyl, 2,4- and 2,5-dimethylphenyl, 2,4,6-trimethylphenyl, 4-ethylphenyl, 4-n-butylphenyl, 4-tert.butylphenyl, 4-tert.amylphenyl, 2- and 4-methoxyphenyl, 2- and 4-ethoxyphenyl, 4-n-butoxyphenyl, 4-fluorophenyl, 2-, 3- and 4-chlorophenyl, 2,4-dichlorophenyl, 4-cyanophenyl, 4-carboxyphenyl, 4-alkoxycarbonylphenyl (4-methoxy- or 4-ethoxy-carbonylphenyl), 2-, 3- and 4-sulphophenyl, 4-phenylphenyl (diphenylyl-4).

If R$_3$ stands for an unsubstituted or substituted alkyl group having 1 to 12 carbon atoms it is preferably methyl, ethyl, n-propyl, iso-propyl, n-butyl, iso-butyl, sec.butyl, tert.butyl, n-amyl, iso-amyl, tert.amyl, n-hexyl, n-octyl, sec.octyl, 2-ethylhexyl, tert.octyl, nonyl, n-decyl, n-dodecyl, tert.-dodecyl (tetrapropylene) when it is unsubstituted. But it may bear substituents such as lower alkoxy groups (methoxy, ethoxy, n-butoxy), phenyl and phenoxy groups, in which case it may be, for example 2-methoxyethyl, 2-ethoxyethyl, 2-n-butoxyethyl, 3-methoxypropyl, 4-methoxybutyl, benzyl, 2-phenylethyl or 2-phenoxyethyl.

Oxidative cyclization of the compound (II) is best carried out in the presence of an oxidation resistant organic solvent. Suitable solvents include hydrocarbons, halogenated and nitrated hydrocarbons such as benzene, toluene, chlorobenzene, ortho-dichlorobenzene, bromobenzene, nitrobenzene, 1,2-dichloroethane, 1,1,2,2-tetrachlorethane, amides such as dimethylformamide, dimethylacetamide, phosphoric acid tris-(dimethylamide), sulphones such as tetramethylene sulphone, ethers such as methoxybenzene and ethoxybenzene, dioxan, 1,2-dimethoxyethane, 1,2-diethoxyethane, tertiary amines such as dimethylaminobenzene and diethylaminobenzene, triethylamine, tri-(n-butyl)-amine, pyridine, picoline, quinoline, and mixtures of pyridine bases.

The suitable oxidizing agents include alkali or alkaline earth hypohalogenites, preferably sodium hypochlorite or hypobromite, inorganic or organic copper II compounds such as copper II chloride, sulphate, acetate, carbonate or naphthenate, preferably in the presence of nitrogen bases such as ammonia, amines such as trimethylamine, ethanolamine, diethanolamine, triethanolamine, pyridine, or air, or oxygen in the presence of catalytic amounts of a copper II compound.

The best temperature range for oxidative cyclization is 0° to 150° C., the optimum range for the alkali hypohalogenides being room temperature to 80° C., and for a copper II compound alone or with oxygen or air in the presence of maximum 10%, preferably about 3–6%, of the stoichiometric amount of a copper II compound 90–130° C.

The starting compounds of Formula II can be produced, for example, by coupling the diazo compound of an amine of formula

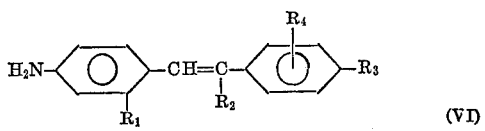

with a compound of formula

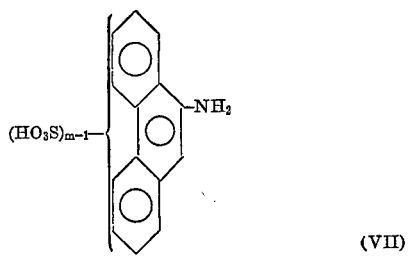

at a pH in the region of 3 to 8, preferably at about pH 5–6, and in the temperature range of 0° to 60° C., i.e. initially at about 5–15° C. and for completion of coupling at about 50–60° C. An aqueous-organic medium is used, e.g. a mixture of water and pyridine, water and a mixture of pyridine bases, water and dimethylformamide or -acetamide, or water and 2-ethoxy-ethanol, or alternatively in an aqueous urea solution.

Examples of suitable compounds of Formula III in which X stands for a —CHO group are benzaldehyde, 4-methylbenzaldehyde, 4-chlorobenzaldehyde, 4-cyanobenzaldehyde, 4-phenylbenzaldehyde (4 - diphenylaldehyde), benzaldehyde-4-carboxylic acid, benzaldehyde-4-sulphonic acid, benzaldehyde-4-sulphonic acid-amide.

The following may be named to exemplify compounds of Formula III in which X is a —CH$_2$—Z— group: phenylacetonitrile, phenylacetic acid, phenylacetic acid ethylester, phenylacetic acid amide, benzylphosphoric acid diethylester, benzylphosphonic acid diphenylester and its derivatives, which may bear a chlorine atom, an alkyl group or a phenyl group in paraposition.

The reaction of a compound of Formula III with a compound of Formula IV is carried out in the presence of a suitable catalyst, e.g. boric acid, zinc chloride, an arylsulphonic acid, an alkali or alkaline earth salt of arylsulphonamides, acetic anhydride, alkali acetates, piperidine, alkali or alkaline-earth hydroxides, alkali or alkaline-earth alcoholates. The temperature range for this reaction is 0–200° C., preferably 20–160° C. If Z stands for hydrogen it is of advantage for the progress of the reaction for the vicinal benzene nucleus to bear a negative substituent such as —CN, —COOH, SO$_3$H or an unsubstituted or substituted ester or amide group of a carboxylic or sulphonic acid.

The reaction can be carried out by melting the reactants, but it is better to react in an inert solvent, for example an aliphatic or aromatic, preferably halogenated hydrocarbon, or an alcohol, ether, glycol or amide such as formamide, dimethylformamide, dimethyl-acetamide, N-methylpyrrolidone, phosphoric acid tris-(dimethylamide), acetonitrile, dimethylsulphoxide, tetramethylenesulphone.

If Z stands for a group containing phosphorus it is split off in the reaction. If Z is, for instance, a COOH group, it is split off afterwards, e.g. by heating to 150–250° C., preferably to about 200° C., in the presence of absence of a solvent of high boiling point such as quinoline. If Z is a carboxylic acid derivative such as an ester of the acid it is first saponified to the COOH group.

The cyano group in a compound of Formula V can be saponified in acid medium if R$_5$ represents, for example, hydrogen, e.g. in an aqueous or aqueous organic acid solution, optimally in 1–10% hydrochloric or sulphuric acid, at elevated temperature, e.g. 80–100° C. of preferably 95–105° C. Usually lactone ring closure takes place simultaneously with saponification.

If R$_5$ stands for a lower alkyl it is more convenient to react in the presence of an aluminium halide, e.g. the bromide or preferably the chloride, in an inert organic solvent, e.g. an aromatic, aromatic halogenated or nitrated hydrocarbon such as benzene, toluene, xylene, chlorobenzene, ortho-dichlorobenzene, bromobenzene, nitrobenzene, ortho-nitrotoluene, or in an aluminum chloride sodium chloride melt, or with pyridine or quinoline hydrochloride or the hydrochlorides of mixtures of pyridine bases. The reaction is carried out at high temperature, e.g. 60–120° C. The alkyl group is often split off in the same operation, the cyan group saponified and the lactone ring closed. If this does not take place, ring closure is accomplished with a hydrogen halide solution in a lower fatty acid such as propionic or acetic acid. Other acid condensing agents can be used, e.g. zinc chloride or aqueous mineral acid solutions.

The compounds of Formula I can be isolated by standard methods, e.g. by filtration with suction if in suspension, by precipitation with a suitable agent and filtration with suction, by evaporation, steam distillation of the solvent and filtration of the precipitated product.

Especially interesting phenanthrotriazolyl derivatives of Formula I are of the formula

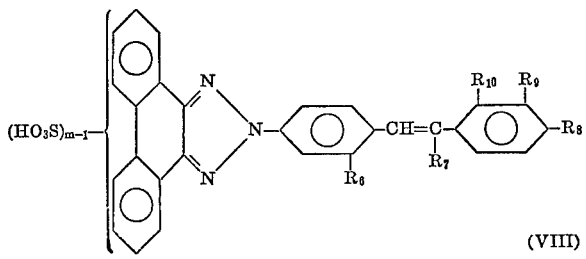

where

R$_6$ stands for hydrogen, cyano, a sulphonic acid group or a sulphonic acid aryl ester group, or together with R$_7$ for a —O—CO group, R$_7$ for hydrogen or together with R$_6$ for a —O—CO group, the —CO being bound to the ethylenic carbon atom, R$_8$ for hydrogen, chlorine, unsubstituted or substituted phenyl, a sulphonic acid group, a sulphonic acid aryl ester group, an unsubstituted or substituted phenylsulphonyl group, or together with R$_9$ a chain

—CH=CH—CH=CH—,

R$_9$ for hydrogen or together with R$_8$ for a chain

—CH=CH—CH=CH—,

R$_{10}$ for hydrogen, chlorine, cyano, a sulphonic acid group or a sulphonic acid aryl ester group, and m for a number from 1 to 3.

In the sulphonic acid arylesters (R$_6$, R$_8$ and R$_{10}$) the aryl radical is preferably mononuclear and may bear substituents such as lower alkyl or alkoxy groups (methyl, ethyl, isopropyl, n-butyl, n-amyl, tert.butyl, tert.amyl, n-hexyl, methoxy, ethoxy, n-butoxy) or halogen atoms (chlorine, fluorine). Notable examples are the phenyl, 2-, 3- and 4-methylphenyl, 2- and 4-methoxyphenyl, 2- and 4-ethoxyphenyl, 2-, 3- and 4-chlorophenyl, 4-fluorophenyl, 4-ethylphenyl, 4-tert.butylphenyl, 4-tert.amylphenyl, 2,4- and 2,5-dimethylphenyl and 2-iso-propyl-5-methylphenyl esters of sulphonic acids.

As an unsubstituted or substituted phenyl or phenylsulphonyl group R$_8$ may have any of the meanings given for R$_3$ and R$_1$.

The water insoluble phenanthrotriazolyl derivatives can be converted into water soluble compounds by treatment with sulphonating agents, e.g. sulphuric acid of 90–100% strength, weak oleum with a maximum SO₃ content of about 30%, chlorosulphonic acid or gaseous SO₃, at temperatures ranging from 0° C. to about 100° C., optimally at 20° C. to 50–60° C. Treatment is continued till the number of sulphonic acid groups necessary to render the product soluble in water has been introduced. If chlorosulphonic acid or gaseous SO₃ is employed, sulphonation can be conveniently carried out in an inert solvent such as sulphuric acid, ortho-dichlorobenzene or nitrobenzene; if concentrated sulphuric acid or oleum is used the sulphonating agent itself acts as solvent. The sulphonic acid group or groups enter preferably into the phenanthrene radical or the right-hand benzene radical.

For the introduction of sulphonic acid ester or amide groups it is advisable to introduce initially one or more sulphonic acid halide, preferably chloride, groups by treatment of the unsulphonated or weakly sulphonated phenanthrotriazolyl compound with an excess of chlorosulphonic acid in an inert solvent such as nitrobenzene or preferably chlorosulphonic acid itself at 0–100° C., preferably about 20–80° C. These groups are then reacted further with ammonia, primary or secondary amines, lower alcohols, e.g. with 1–8 carbon atoms, or phenols, preferably of the benzene series. The reaction with ammonia, primary or secondary amines can be carried out at 0–100° C. in aqueous, aqueous-organic or organic medium, using as organic solvent one which is inert to the —SO₂Hal groups under the reaction conditions, e.g. lower alcohols (methanol, ethanol, iso-propanol), ethers (diethylether, di-iso-propylether, dioxan, 1,2-dimethoxyethane, 1,2-diethoxyethane, methoxybenzene, ethoxybenzene), ketones (acetone, methylethyl ketone) halogenated alkanes (methylene chloride, chloroform), aromatic, aromatic halogenated and aromatic nitrated compounds (benzene, toluene, xylene, chlorobenzene, nitrobenzene), or an excess of the amine provided it is liquid at the reaction temperature (aniline, cyclohexylamine, benzylamine, ethylamine, diethylamine, ethanolamine, diethanolamine, morpholine, etc.).

The reaction is carried out in the temperature range of 0° C. to about 60° C. using an aqueous, aqueous-organic or organic medium in the presence of an agent which binds acid (alkali-metal hydroxide, carbonate, bicarbonate, phosphate, calcium carbonate, pyridine or an excess of the amine) when an aliphatic amine or ammonia is employed. When aromatic amines are used it is carried out at 50–100° C. in aqueous medium (cf. Houben-Weyl, Methoden der organischen Chemie, vol. IX, pp. 606–615 (1955)). The reaction with an alcohol (methanol, ethanol, n-butanol, n-pentanol, 2-ethylhexanol, cyclohexanol, benzyl alcohol, 2-methoxy-, 2-ethoxy- or 2-n-butoxy-ethanol, tetrahydrofurfuryl alcohol) can be effected without an acid-binding agent in the alcohol itself by increasing the temperature from, e.g. 60° C. to 120° C., if necessary with reflux, or alternatively in the presence of an alkali-metal hydroxide or alcoholate or a tertiary amine such as pyridine at 0° C. to 30–40° C.

With the phenols (phenol itself, 2-, 3- or 4-methylphenol, 2-, 3- or 4-chlorophenol, 4-iso-propyl-, 4-tert.-butyl-, 4-tert.amyl- or 4-tert.octylphenol), the reaction can be carried out in aqueous medium in the presence of an alkali-metal hydroxide at room temperature to 100° C., preferably at 50–80° C., or in pyridine at 0–60° C. (cf. Houben-Weyl, Methoden der organischen Chemie, vol. IX, pp. 664–673 (1955)).

For the introduction of sulphonic acid halide groups the phenanthrotriazolyl compounds, which already contain sulphonic acid groups, e.g. in the form of the alkali-metal salts, can be reacted with phosphorus halides such as phosphorus oxychloride or pentachloride or with a mixture of chlorine and phosphorus trichloride, if necessary in the presence of an inert solvent such as chlorobenzene, benzene, toluene, xylene, nitrobenzene, at e.g. 60° C. to 180° C., or with an excess of chlorosulphonic acid or fluorosulphonic acid at room temperature to about 100° C. (cf. Houben-Weyl, Methoden der organischen Chemie, vol. IX, pp. 564–579 (1955)).

The new phenanthrotriazolyl compounds of Formula I have excellent properties for the optical brightening of a variety of organic materials and plastics, by which are understood in particular natural fibres such as cotton and wool and synthetic fibre-forming polymers such as polyesters, polyamides, polyurethanes, polyolefins (polyethylene, polypropylene), polyvinyl acetate, polyvinyl chloride, polyvinylidene chloride, polyacrylonitrile, modified polyacrylonitrile, cellulose acetate, cellulose triacetate and polystyrene.

For optical brightening, the phenanthrotriazolyl compounds can be applied by the normal methods, e.g. from solution in water or organic solvent or from aqueous dispersion. They can be incorporated with successful results in spinning solutions and melts and in moulding materials, and also in the monomers or prepolymers prior to synthesis of the final polymer. Depending on the method of application they are employed in amounts of 0.001–0.5%, preferably 0.01–0.2%, relative to the weight of the material. They can be used alone or in combination with other optical brighteners, and in the presence of surface-active agents such as detergents, carriers, and chemical bleaching agents.

If the material for brightening is textile fabric it is advisable to pad the phenanthrotriazolyl compound in an aqueous liquor containing a surface-active agent and to fix the brightener on the fabric by treatment in dry heat, preferably at 150–240° C., following the procedure used in the thermosol process.

The disclosed brighteners have a very high saturation limit and produce effects showing a neutral blue-violet to blue fluorescence shade and outstanding light fastness.

In comparison with the analogous naphthotriazolyl compounds described in British Pat. 717,884, 1,051,814 and 1,052,355, the phenanthrotriazolyl compounds produced according to this invention are more highly effective as brighteners, less volatile which means more resistant to sublimation, and have a more neutral shade.

In the following examples the parts and percentages are by weight and the temperatures in degrees centigrade. The melting points are uncorrected.

EXAMPLE 1

A solution of 9 parts of 4-amino-phenylstilbene in 90 parts of dimethylformamide is prepared, to which are added consecutively 10 parts of concentrated hydrochloric acid, 90 parts of water and 60 parts of ice. The solution is cooled to 5° with stirring and diazotized with a solution of 4 parts of sodium nitrite in 15 parts of water, the temperature being kept at 0–5° during the reaction. After the reaction stirring is continued for 3 hours, then the excess nitrous acid is decomposed with urea or sulphamic acid.

Meanwhile 8 parts of finely pulverized 9-aminophenanthrene hydrochloride are dispersed in a mixture of 40 parts of pyridine and 40 parts of 2 N sodium hydroxide solution. The dispersion is run into the diazo suspension in 10 minutes. The reaction mixture is heated to 50–60°, held at this temperature for 1 hour with stirring, and then cooled, on which the red azo compound settles out. It is filtered with suction, washed with water until neutral and dried.

The 18 parts of the pale red azo compound thus obtained are added to 20 parts of crystallized copper acetate and 90 parts of pyridine, reacted for 2 hours with heating and stirring and with the introduction of a weak air current. On cooling the phenanthrotriazolyl compound formed is filtered, washed, consecutively with ethanol and water till the wash water is colourless, and dried. On recrystallization from 300 parts of chlorobenzene it is obtained as yellow crystals with melting point 299–301°. The absorption maximum of the compound in chloroform solution is at 377 nm./$6.1 \cdot 10^4$. Its formula is

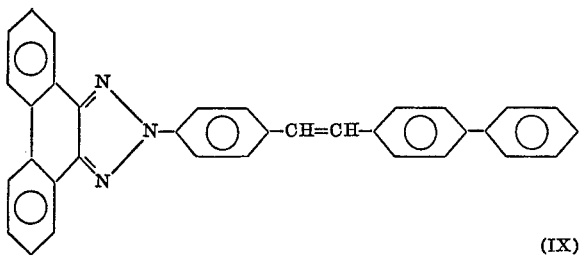

(IX)

When 4-amino-4'-phenylstilbene used in this example is replaced by the equivalent amount of 4-amino-4'-phenylsulphonylstilbene, 4 - amino - 4'-(4" - methylphenylsulphonyl) - stilbene, 4 - aminostilbene - 4' - sulphonic acid phenylester or 4 - aminostilbene - 4' - sulphonic acid-(4"-methylphenylester), water insoluble optical brighteners of comparably good quality are obtained, while the use of 4 - aminostilbene - 4' - sulphonic acid results in a water soluble brightener.

EXAMPLE 2

A mixture of 62 parts of 2-(4"-methylphenyl)-4,5,9',10'-phenanthrotriazole of formula

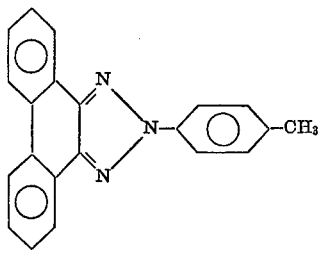

(X)

52 parts of diphenyl - 4 - aldehyde - anile and 1500 parts of dimethyl formamide is set for reaction with 67 parts of potassium tert.butylate, added with stirring. The deep blue mixture is reacted for 3 hours at 20–30° with stirring, after which 2000 parts of water and 2000 parts of 10% hydrochloric acid are added consecutively at 10–15°. The yellow precipitate formed is filtered with suction, washed neutral with water and methanol, and vacuum dried at 80°. It is recrystallized from dimethylformamide with the aid of activated carbon in the form of brilliant yellow crystals with melting point 299–300°. The formula is the same as in Example 1.

Further phenanthrotriazolyl derivatives of Formula VIII which can be produced in accordance with this invention are set forth in the table below. They are distinguished by the meanings of the symbols $R_6$ to $R_{10}$, the melting point, the self colour, the fluorescence colour in chlorobenzene or in water-ethanol 1:1, and the position of the absorption maximum.

The compound of Example 13 can be produced as follows. 25 parts of 2-methoxy-4-amino-α-cyanostilbene are dissolved in a mixture of 59 parts of 35% hydrochloric acid and 500 parts of water with heating. On cooling a suspension of the hydrochloride of the aminostilbene is formed, which is held at about 10° while a solution of 7 parts of sodium nitrite in 30 parts of water is run into it with stirring. The mixture is maintained at 10° for 1 hour, then the excess nitrous acid is decomposed with sulphamic acid.

In the meantime 23 parts of finely pulverized 9-aminophenanthrene hydrochloride are dispersed in 120 parts of pyridine and 120 parts of 2 N sodium hydroxide solution. The dispersion is added to the diazo suspension in 20–30 minutes at 5–10°, then the mixture is reacted at 50–60° for 1 hour with stirring and allowed to cool. The precipitated red azo compound is filtered with suction, washed neutral with water, and dried.

22.7 parts of this ortho-aminoazo compound are dissolved in 300 parts of pyridine. A solution of 300 parts of crystallized copper sulphate and 54 parts of 28% aqueous ammonia solution in 40 parts of water is added to the solution. The temperature is kept at 90–95° to give a solution which is boiled with reflux. On cooling the crystalline product settles out. It is filtered, washed with cold acetone and then with hot water, and dried. The crude triazolylcyanostilbene thus obtained is purified by recrystallization from chlorobenzene.

15 parts of this triazolylcyanostilbene are dissolved in 140 parts of benzene, 15 parts of anhydrous aluminum chloride added, and the mixture is raised to the boil and boiled for 7 hours with reflux. It is then added to a mixture of 300 parts of ice and 19 parts of concentrated hydrochloric acid. The benzene is removed by steam distillation, the residue filtered, washed with water and dried. On recrystallization from chlorobenzene the phenanthrotriazolyl coumarin derivative is obtained as a pale yellow solid showing intense blue-violet fluorescence.

EXAMPLE 14

The diazo compound of 4-amino-4'-phenylstilbene used in Example 1 can be replaced by the diazo compounds of 4-amino-4'-tert.butylstilbene, 4-amino-4'-tert.octylstilbene, 4-amino-4'-tert.dodecylstilbene, 4-amino-4'-butylstilbene or 4-amino-4'-tert.amylstilbene and the procedure of that example employed to give the corresponding phenanthrotriazolyl derivatives. These are pale yellow compounds showing red-violet fluorescence in chlorobenzene.

EXAMPLE 15

31.7 parts of 4-amino-4'-iso-propylstilbene-2-sulphonic acid are dissolved in 300 parts of water and 13.4 parts of 30% sodium hydroxide solution at about 20–25°. A solution of 6.9 parts of sodium nitrite in 20 parts of water

TABLE

| | $R_6$ | $R_7$ | $R_8$ | $R_9$ | $R_{10}$ | Melting point, °C. | Self colour | Flourescence colour | $\lambda_{max}$, nm. |
|---|---|---|---|---|---|---|---|---|---|
| Example number: | | | | | | | | | |
| 3 | H | H | H | H | H | 220-2 | Pale yellow | Red-violet | 370 |
| 4 | CN | H | Cl | H | H | 256-8 | Light yellow | do | 373 |
| 5 | SO₃Na | H | H | H | H | | do | Blue-violet | 367 |
| 6 | SO₃Na | H | Cl | H | H | | do | do | 369 |
| 7 | —SO₃—⟨◯⟩ | H | H | H | H | 246-8 | Pale yellow | Red-violet | 370/5.3·10⁴ |
| 8 | CN | H | —CH=CH—CH=CH— | | H | 278-81 | Light yellow | Blue | 380 |
| 9 | CN | H | CH₃ | H | H | 277-9 | do | Violet | 374 |
| 10 | CN | H | Cl | H | Cl | 326-8 | Pale yellow | do | 374 |
| 11 | CN | H | —⟨◯⟩—H | H | H | 280-2 | Brilliant yellow | Blue-violet | 377 |
| 12 | —SO₃—⟨◯⟩ | H | Cl | H | H | | Pale yellow | Violet | 375 |
| 13 | —O—CO— | | H | H | H | 283-4 | Light yellow | Blue-violet | | is added, the solution cooled to about 5°, and indirect diazotization carried out at 8–10° by the addition of 25 parts of 35% hydrochloric acid.

The diazo suspension is run into a suspension of 23 parts of 9-aminophenanthrene hydrochloride at about 10°, prepared as given in Example 1. On completion of coupling the ortho-aminoazo compound is isolated and the oxidative cyclizing reaction carried out as specified in Example 1. The new brightener is a yellow powder which dissolves in water with blue-violet fluorescence.

Oxidative cyclization can also be carried out as follows. The dry ortho-aminoazo compound is dissolved in 300 parts of warm pyridine, a solution of 12 parts of sodium hydroxide in 30 parts of water is added, the combined solution is heated to 60–65°, 150 to 170 parts of 17% sodium hypochlorite solution are slowly dropped in and heating continued at 70–80° till no further dye is indicated. After the addition of 2–4 parts of sodium hydrosulphite the pyridine is driven off with steam, and the triazole filtered with suction, washed with dilute sodium chloride solution and dried.

EXAMPLE 16

At 10–20° 10 parts of the optical brightener obtained in Example 1 are entered into 40 parts of 100% sulphuric acid, with stirring until completely in solution. 10 parts of 25% oleum are dropped in at 15–20° and stirring continued for a few hours at 30–40 till a sample is found to be fully soluble in water. The sulphonating mixture is unloaded into a mixture of 100 parts of ice and 100 parts of water, the solution neutralized with sodium hydroxide solution, and the product salted out with sodium chloride, filtered, washed with sodium chloride solution if necessary, and dried. The new brightener is obtained as a yellow powder which dissolves in water with violet fluorescence.

APPLICATION EXAMPLE A

A mixture of 10 parts of the compound of Example 4, 22 parts of a highly sulphonated castor oil, 8 parts of sodium diocytylphenylpolyglycolether oxyacetate containing 40 ethenoxy groups in the molecule and 80 parts of water is prepared. It is ground in a sand mill or other suitable machine until the particle size distribution is predominantly 0.5–2 microns.

A bath is set with 2 parts of the aforedescribed dispersion, 15 parts of a carrier based on ortho-dichlorobenzene and 300 parts of water. 100 parts of a fabric of polyester (polyethylene terephthalate) fibre are entered into the bath at 50°. The bath is brought to the boil in 30 minutes and held at the boil for 45 minutes, after which the fabric is removed, treated for 10 minutes at 70° and liquor ratio 40:1 in an aqueous solution of 1.5 g./l. octylphenyl decaglycolether, rinsed with warm water and dried. The polyester fabric shows pronounced brightness after the treatment. If an enclosed machine operated at 120–130° is used, comparable white effects can be obtained without the addition of a carrier.

APPLICATION EXAMPLE B

In a mixer, polyamide 6(poly-caprolactam) granules are powdered with 0.01–0.05% of their weight of the compound of Example 13. The granules are conveyed into a melt spinning machine, where they are melted for 30 minutes at about 300° under nitrogen, stirred at this temperature for 15 minutes, heated to the spinning temperature, 285°, and spun as monofilament at 3–5 atmospheres excess pressure (nitrogen). The filament exhibits blue-violet fluorescence in daylight. It has a much whiter and brighter appearance than filament spun without an optical brightener.

If polyester or polypropylene in place of polyamide is spun at 290° or 260° respectively, filaments showing a higher degree of whiteness than comparable unbrightened filament are obtained.

The compound of Example 13 can be replaced by the equivalent amount of a mixture of 60–90% of the compound of Example 13 and 40–10% of the compound of Example 4, on which brightened filament showing reddish to bluish violet fluorescence is obtained.

APPLICATION EXAMPLE C 100 parts of polypropylene granules are powdered in a mixer with 0.01 part of the compound of Example 1, processed on a roller mill at 144–220° and either extruded as sheet or regranulated and injection moulded in the desired form. The moulded products have an appreciably higher degree of whiteness than unbrightened products. The polypropylene can be replaced by high density or low density polyethylene, another polyolefin, polystyrene or cellulose acetate.

APPLICATION EXAMPLE D 100 parts of moulding material consisting of 65 parts of polyvinyl chloride, 35 parts of a plasticizer such as dioctyl phthalate and 2%, relative to the polymer, of a stabilizer are mixed with 0.005 part of the compound of Example 7 in solution in the same plasticizer. The mixture is processed on a roller mill for 10 minutes at 150–160° and extruded as film. If opaque film is desired, 2.5% titanium dioxide is mixed with the material before processing. Films thus produced have a superior appearance to films containing no brightening additive.

APPLICATION EXAMPLE E

A suspension of 12 parts of the dispersion described in the first paragraph of Application Example A in 988 parts of water is padded on a fabric of polyamide 66 fibre at 25° with an expression giving a 100% increase on the dry weight. After intermediate drying at 60° the brightener is fixed by treatment for 50 seconds in dry heat at 200°. The treatment imparts a pronounced brilliant white effect to the fabric.

Formulae of representative phenanthrotriazolyl derivatives of the foregoing examples are as follows:

Example 4

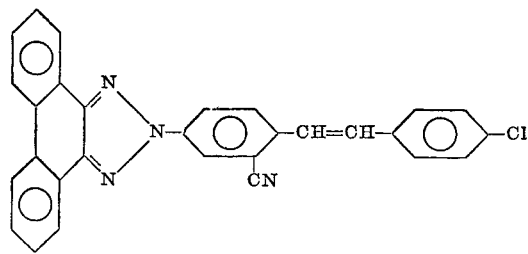

Example 5

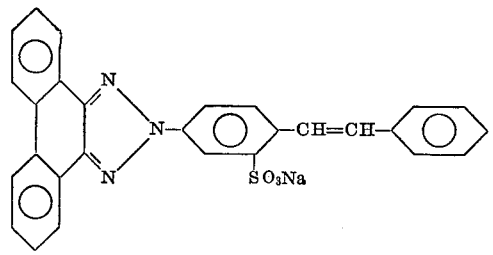

Example 11

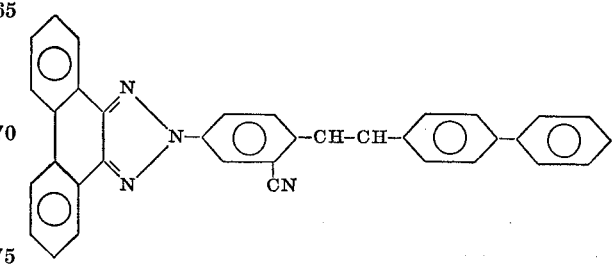

Example 13

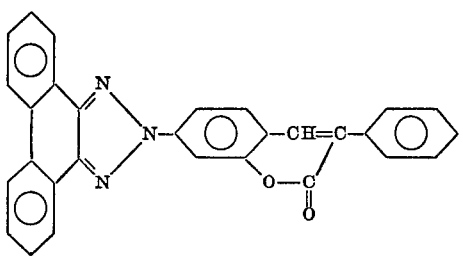

Having thus disclosed the invention what we claim is:
1. A compound of the formula

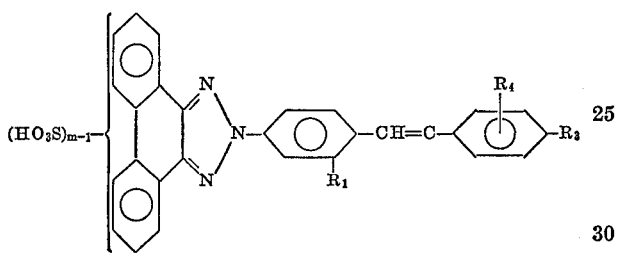

wherein
R₁ is hydrogen; chloro; fluoro; cyano; a carboxylic or sulfonic acid group; an alkyl, cycloalkyl or aryl ester of carboxylic or sulfonic acid; carboxylic acid amide; sulfonic acid amide; an N-substituted or N,N-disubstituted carboxylic or sulfonic acid amide; alkylsulfonyl of 1 to 6 carbon atoms; or phenyl sulfonyl which may be substituted by lower alkyl, lower alkoxy or halo; or jointly with R₂ stands for an —O—CO— group, the —CO being bound to the ethylenic carbon,
R₂ is hydrogen, a carboxylic acid group or, with R₁ an —O—CO— group,
R₃ is, independently, a group represented by R₁, except —O—CO—; phenyl; cyanophenyl; carboxyphenyl; lower alkoxycarbonylphenyl; sulfophenyl; mono- or polyalkyl- or -alkoxyphenyl in which the alkyl groups contain 1 to 6 carbon atoms; mono- or polychloro- or -fluorophenyl; diphenylyl; alkyl of 1 to 12 carbon atoms which may be substituted by lower alkoxy, phenyl or phenoxy; or jointly with R₄, when R₄ occupies a vicinal position to R₃, a chain

—CH=CH—CH=CH—,

R₄ is, independently, a group represented by R₁ except —O—CO—, or jointly with R₃ a

—CH=CH—CH=CH— chain, and
$m$ is 1, 2, or 3
provided that any aryl groups are phenyl or naphthyl and that the substituents on the substituted carboxylic and sulfonic acid amides are, independently, alkyl, cycloalkyl or aryl and, with respect to these substituents and the alkyl, cycloalkyl and aryl portions of the carboxylic and sulfonic acid esters, the alkyl groups contain 1 to 6 carbon atoms, and the alkyl, cycloalkyl and aryl groups are unsubstituted or substituted by lower alkyl, lower alkoxy, chloro, fluoro, phenyl, phenoxy, lower alkoxy (lower) alkoxy, or hydroxy.

2. A compound according to claim 1 of formula

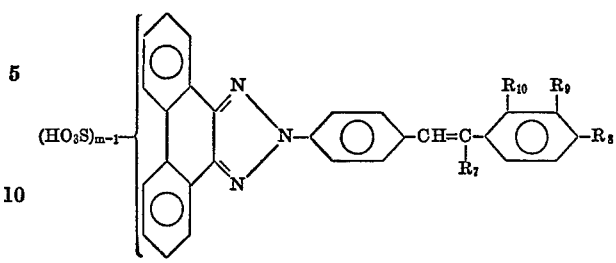

wherein
R₆ stands for hydrogen, cyano, a sulphonic acid group or a sulphonic acid phenyl ester group, or together with R₇ for a —O—CO— group,
R₇ for hydrogen or together with R₆ for a —O—CO— group, the —CO being bound to the ethylenic carbon atom,
R₈ for hydrogen, chlorine, unsubstituted or substituted phenyl, a sulphonic acid group, a sulphonic acid phenyl ester group, an unsubstituted or substituted phenylsulphonyl group, or together with R₉ a chain —CH=CH—CH=CH—,
R₉ for hydrogen or together with R₈ for a chain —CH=CH—CH=CH—, and
R₁₀ for hydrogen, chlorine, cyano, sulphonic acid group or a sulphonic acid phenyl ester group at least one of R₉ and R₁₀ being hydrogen
with the provisio that any phenyl ester may be substituted by lower alkyl, lower alkoxy, chloro, fluoro, or phenyl.

3. Phenanthrotriazolyl derivative according to claim 2, wherein
R₆ stands for hydrogen, cyano, a sulphonic acid group or sulphonic acid phenyl ester or together with R₇ a —O—CO— group,
R₇ for hydrogen or a —O—CO— group which is bound through —CO— to the ethylenic carbon atom,
R₈ for hydrogen, chlorine or phenyl,
each of R₉ and R₁₀ for hydrogen, and
$m$ for 1, 2 or 3.

4. The phenanthrotriazolyl derivative according to claim 1 of the formula

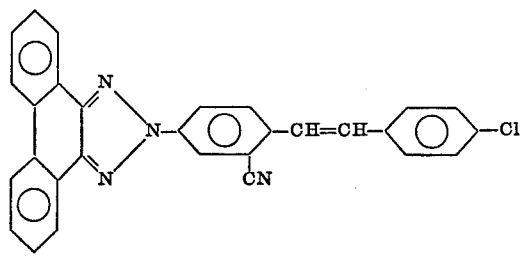

5. The phenanthrotriazolyl derivative according to claim 1 of the formula

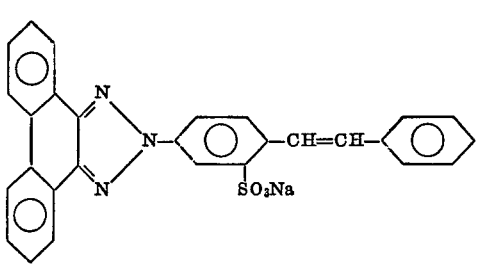

6. The phenanthrotriazolyl derivative according to claim 1 of the formula

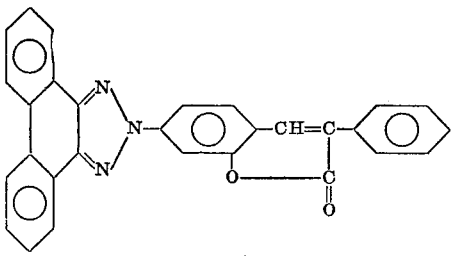

7. The phenanthrotriazolyl derivative according to claim 1 of the formula

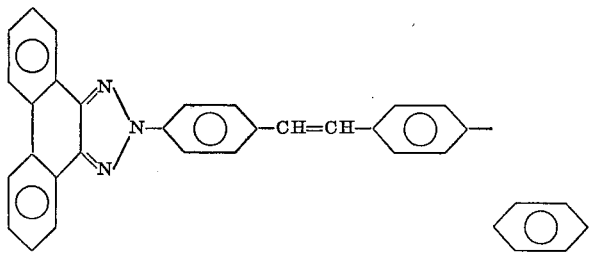

8. The phenanthrotriazolyl derivative according to claim 1 of the formula

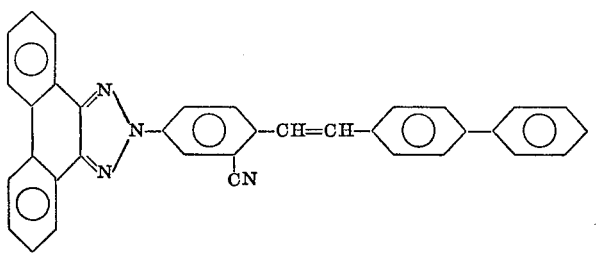

9. A compound according to claim 2 wherein $R_{10}$ is hydrogen.

10. A compound according to claim 1 wherein
$R_1$ is hydrogen; fluoro; chloro; cyano; a carboxylic or sulfonic acid group; a carboxylic or sulfonic acid amide group; an N-substituted or N,N-disubstituted carboxylic acid or sulfonic acid amide in which the substituents are, independently, alkyl of 1 to 6 carbon atoms which may be substituted with hydroxy, lower alkoxy, phenyl, or phenoxy, cyclohexyl which may be substituted by lower alkyl, phenyl which may be substituted by lower alkyl, lower alkoxy, fluoro, chloro or phenyl or naphthyl; a carboxylic or sulfonic acid alkyl, cyclohexyl, phenyl or naphthyl ester of which the alkyl group contains 1 to 6 carbon atoms and may be substituted by lower alkoxy, lower alkoxy (lower) alkoxy, hydroxy, chloro, fluoro, phenyl or phenoxy, the cyclohexyl group may be substituted by lower alkyl, and the phenyl group may be substituted by lower alkyl, lower alkoxy, chloro, fluoro or phenyl; alkylsulfonyl of 1 to 6 carbon atoms or phenylsulfonyl which may be substituted by lower alkyl, lower alkoxy, chloro, or fluoro, or with $R_2$ an —O—CO— group, and $R_3$ and $R_4$ are as defined in claim 1 except that the groups represented by $R_1$ are as herein defined.

11. A compound according to claim 10 wherein $R_4$ is hydrogen or, jointly with $R_3$, —CH=CH—CH=CH—.

References Cited
UNITED STATES PATENTS
3,101,333  8/1963  Adams et al. _____ 260—240 C OTHER REFERENCES
Chemical Abstracts, vol. 62, col. 10390 (1965).

JOHN D. RANDOLPH, Primary Examiner

U.S. Cl. X.R.
117—335 T; 252—301.2 W, 543; 260—30.4, 40 P, 413, 75 N, 78 R, 192, 308 B